US00RE38089E

(19) United States
(12) Reissued Patent
Kajiura

(10) Patent Number: US RE38,089 E
(45) **Date of Reissued Patent: *Apr. 22, 2003**

(54) CARD CONNECTOR

(75) Inventor: Motomu Kajiura, Tokyo (JP)

(73) Assignee: FCI Americas Technology, Inc., Reno, NV (US)

( * ) Notice: This patent is subject to a terminal disclaimer.

(21) Appl. No.: 10/115,306

(22) Filed: Apr. 3, 2002

Related U.S. Patent Documents

Reissue of:
(64) Patent No.: 6,045,366
Issued: Apr. 4, 2000
Appl. No.: 09/052,088
Filed: Mar. 31, 1998

(30) Foreign Application Priority Data

Apr. 18, 1997 (JP) ..... 9-101794

(51) Int. Cl.[7] ..... H01R 12/00
(52) U.S. Cl. ..... 439/64; 439/159
(58) Field of Search ..... 439/541.5, 64, 439/377, 159

(56) References Cited

U.S. PATENT DOCUMENTS 5,871,365 A * 2/1999 Kajiura ..... 439/159
6,364,674 B1 * 4/2002 Kajiura ..... 439/159

* cited by examiner

*Primary Examiner*—Jean F. Duverne
(74) *Attorney, Agent, or Firm*—Woodcock Washburn LLP

(57) ABSTRACT

A card connector is provided which can be very simply and accurately mounted on either side of a printed circuit board with less component parts. A plurality of pairs of mount brackets (70, 80) include body sections (72, 82) mounted on a connector frame 18, stand-off sections (74, 84) extending from the body sections and screw holes of the stand-off sections and are adapted to fixedly hold the printed circuit board in place. One of the mount bracket's body section (72, 82) and a connector frame 18 has a screw hole (66, 86) and the other having a claw (76, 96) inserted in the latch hole. Through the engagement of the retaining claw with the latch hole, the respective mount brackets (70, 80) can be fixedly held on the connector fame. In inverted and non-inverted positions of the respective mount brackets (70, 80), the card connector allows the respective screw hole positions to be retained in the same corresponding positions along a width direction and insertion/withdrawal direction of a PC card C.

7 Claims, 6 Drawing Sheets

CARD CONNECTOR

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates to a card connector mounted on a printed circuit board to allow an electrical connection to be made between a PC card and the printed circuit board.

2. Brief Description of Prior Developments

Generally, in order to enhance both the miniaturization and expendability of an electronic apparatus such as a notebook type computer, various types of card connectors have been developed which connect a PC card equipped with various functions to an electronic apparatus.

Such a card connector includes a connector frame comprising a pair of guide arms with PC card insertion slots formed therein and a header section integrally joined to the guide arms and is screwed to the printed circuit board via the connector frame. In the case where a card connector has mutually stacked two headers so as to deal with PC cards of different thicknesses, these headers and guide arms are coupled together as one unit by brackets of a thin metal and it is screwed to the printed circuit board through the brackets. In either case, a slight clearance is created between the card connector and the printed circuit board.

In the recent tendency of the electronic apparatus toward its miniaturization and high-performance functioning, there may sometimes the cases where it is preferable to mount the card connector on the upper or the lower side of a printed circuit board as the necessity arises in these electronic apparatuses.

Even if, however, the card connector is mounted on either side of the printed circuit board, it is desirable that, in order to prevent any insertion error of the PC card, the polarity, that is, the surface side, of the PC card be always set in the same correct side. For this reason, where the conventional card connector is to be mounted on the other surface side of the printed circuit board, it has been necessary to perform a complex attaching operation, such as replacing an array of terminal pins in the header. If, for example, connectors and brackets of various structures corresponding to the attaching positions such as the upper or the lower side of the printed circuit board are initially prepared, more component parts are necessary and the dimensional accuracy of the card connectors are lowered through the cumulative addition of the manufacturing tolerances of the component parts.

SUMMARY OF THE INVENTION

It is accordingly the object of the present invention to provide a card connector which can be very simply and accurately mounted on either side of a printed circuit board and requires less component parts.

The card connector of the present invention solving the task of the present invention is mounted on a printed circuit board to allow a PC card to be electrically connected to the printed circuit board, comprising:

a connector frame including a header section having a plurality of terminal pins which are connected to the PC card arranged along a width direction of the PC card and a pair of opposed guide arms each extending at each side end of the header section and allowing both side edges of the PC card to be guided along an insertion/withdrawal direction of the PC card;

a plurality of pairs of mount brackets each having a body section mounted on the connector frame, a stand-off section extending from the body section and adapted to retain a predetermined distance between the connector frame and the printed circuit board, and a coupling section projected from the stand-off section into an opening of the printed circuit board and tightened by a fastening means from a side opposite to that of the printed circuit board whereby the connector frame is fixed to the printed circuit board, wherein a latch hole is provided in one of the mount bracket's body section and connector frame and a corresponding retaining claw is provided on the other to allow an insertion into the latch hole and, through an engagement of the retaining claw with the latch hole, the respective body section is fixed to the connector frame, and, when the mount bracket is inverted, the coupling section is situated in the same corresponding position, along a width and insertion/withdrawal directions, with the stand-off position so that the printed circuit board can be mounted in any selected side of the printed circuit board.

In the card connector of the present invention, even if the mount bracket is inverted, the respective coupling section is situated in the same corresponding position along the width and insertion/withdrawal direction and, simply by changing the direction of the mount bracket, the card connector can be mounted on either side of the printed circuit board.

It is desirable that the stand-off section of the respective mount bracket have a support plate section extending from a forward end section and arranged between the connector frame and the printed circuit board and that the coupling section have a cylindrical projection projected from the support section in a direction away from the body section and have a screw hole on the inner surface. In this case, the card connector is positioned by the cylinder projection relative to the printed circuit board.

It is preferable that the header section have two header bodies of the same structure mutually stacked along the thickness direction of the PC card and that these header bodies by integrally so jointed that one end sides in the insertion/withdrawal direction of the PC card are mechanically and electrically connected to those terminal pins inserted from the same side and that the other end sides are held by the paired guide arms.

It is preferable that the card connector further comprise an ejecting mechanism mounted at the header section and be adapted to withdraw the PC card. A push rod is provided at one of the pair guide arms and is adapted to operate the ejecting mechanism in which the push rod allows a slidable guide motion of the PC card to be effected, along the insertion/withdrawal direction of the PC card. In this case, it is not necessary to provide any separate guide member for the push rod, so that component parts required can be reduced.

Further a card connector comprises a header section having an array of terminal pins connected to a PC card. A pair of opposed guide arms is provided on both sides of the header section and extends rearwardly from a rear end section of the header section and adapted to guide each side edge of the PC card in an insertion/withdrawal direction, the card connector being mounted on a printed circuit board to allow electrical connection to be achieved between the PC card and a printed circuit board, wherein the pair of guide arms have mutually the same structure and include a core section formed of a metal plater and a resin portion formed integral with the core section, each resin portion having a guide groove for guiding the side edge of the PC card. The card connector, having an integral unit of the guide arms of the same structure, is easier to manufacture and can achieve less component parts. In the case where contacting pieces extending from the core portion are projected into the guide arms, the PC card can be grounded through the contacting pieces before the PC card reaches the header section, so that it is possible to prevent a shock resulting from a greater electrostatic voltage difference.

In the case where the guide arms has at least one guiding arm projected from its resin portion and insertable into a corresponding joining hole opened at the rear end portion of the header section, they are very easily attached to, or detached from, each other. As a result, the card connector can be assembled in less manufacturing steps.

Further, a mount guide is provided for mounting, on a printed circuit board, a card connector having a connector frame including a header section having an array of terminal pins connected to a PC card and a pair of opposed guide arms extending from both side ends of the header section and adapted to guide the side edge portions of the PC card in an insertion/withdrawal direction, the mount bracket comprising:

a body section mounted on the connector frame;

a stand-off section extending from the body section and allowing a predetermined spacing to be retained between the connector frame and the printed circuit board; and a coupling section projected from the stand-off section into an opening of the printed circuit board and adapted to be tightened by a fastening means from an opposite side of the printed circuit board, wherein the body section has four tongues latched to the connector frame, the four tongues being situated on mutually orthogonal two symmetric axes.

BRIEF DESCRIPTION OF THE DRAWINGS

The embodiment of the present invention will be explained below with reference to the accompanying drawings.

FIG. 5(B) a plan view diagrammatically showing the guide arm, FIG. 5(C) a side view diagrammatically showing a state as viewed from a C—C direction in FIG. 5(C) and FIG. 5(D) a diagrammatic view showing a push rod for operating an ejecting mechanism mounted on the guide arm.

DETAILED DESCRIPTION OF THE PREFERRED EMBODIMENT

Figure 5A:
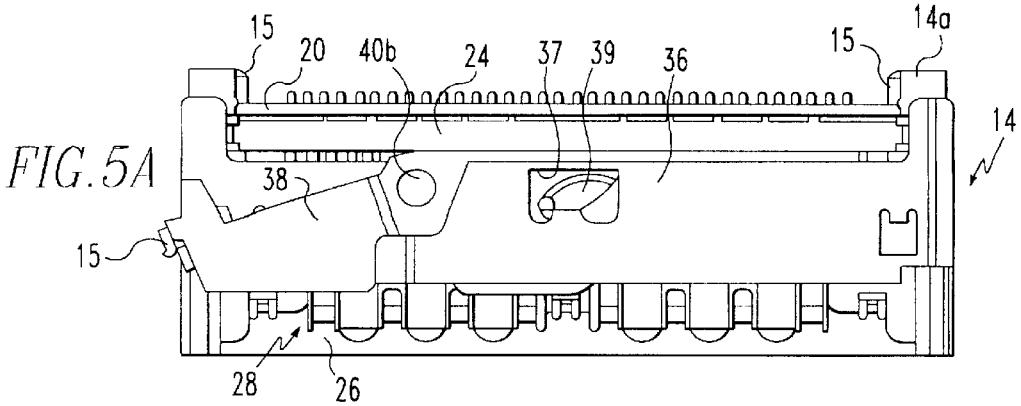
FIGS. 5(A) to (D) show a state in which guide arms are mounted on a header section, FIG. 5(A) being a plan view diagrammatically showing the header section mounted in FIG. 4.
Figure 5D:
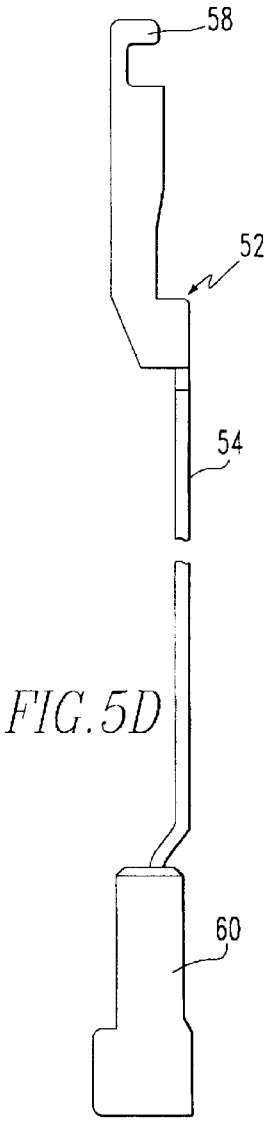
Figure 6A:
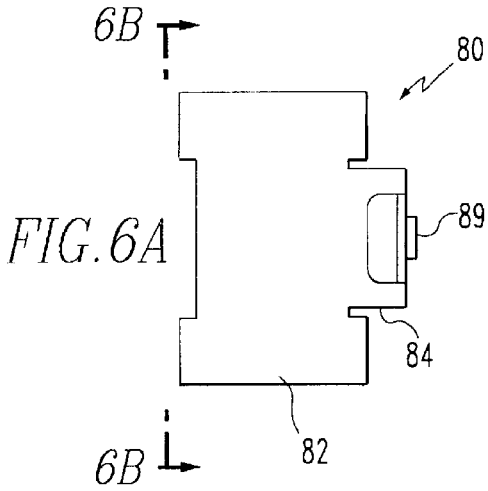
FIGS. 6(A) to 6(D) show a mount bracket mounted on the guide arm, FIG. 6(A) being a side view showing the mount bracket mounted on the guide arm on a push rod side, FIG. 6(B) a bottom view showing a state as viewed from a B—B direction in FIG. 6(A), FIG. 6(C) a side view showing the mount bracket mounted on the guide arm on a push rod not-placing side, and FIG. 6(D) a bottom view showing a state as viewed in a D—D direction in FIG. 6(C)
Figure 6C:
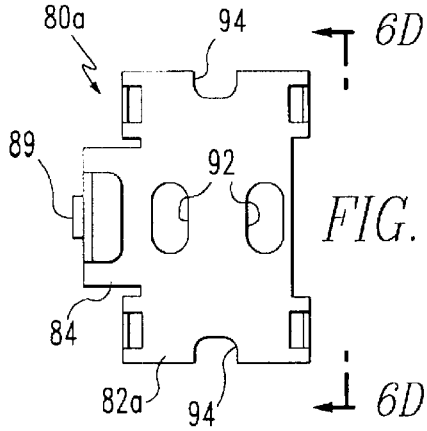
Figure 6B:
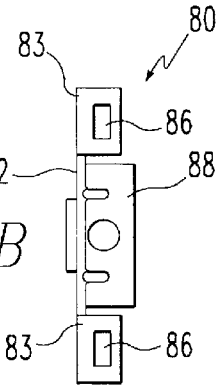
Figure 6D:
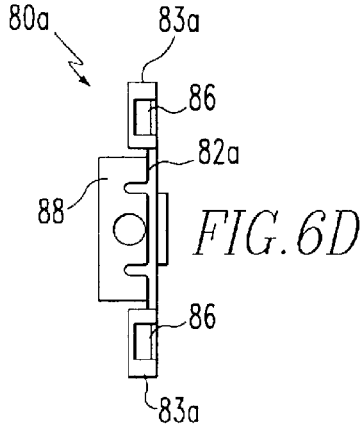
Figure 7:
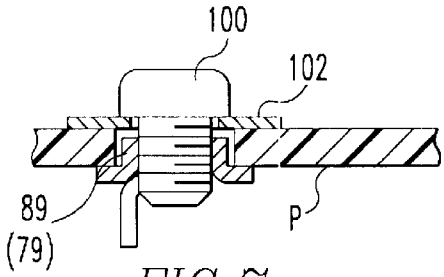
FIG. 7 is a cross-sectional view diagrammatically showing a state in which the mount bracket is fixed by a screw to printed circuit board.

FIGS. 1 to 7 show a card connector 10 according to a preferred embodiment of the present invention. The card connector 10 of the present embodiment is fastened by a screw means to a lower-side surface side of a printed circuit board P (FIG. 7).

Figure 1:
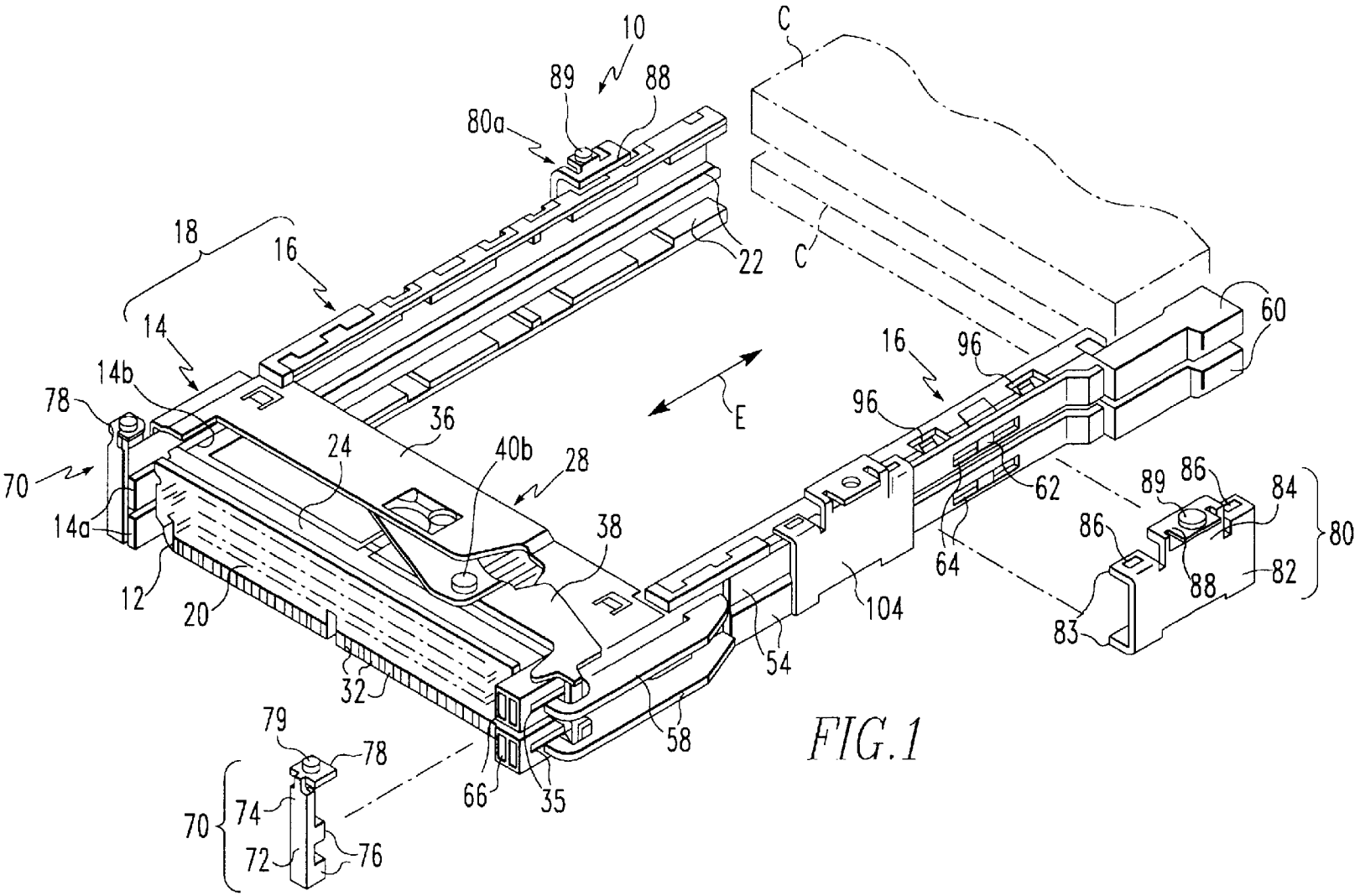
FIG. 1 is a perspective view diagrammatically showing a card connector according to a preferred embodiment of the present invention.
Figure 2:
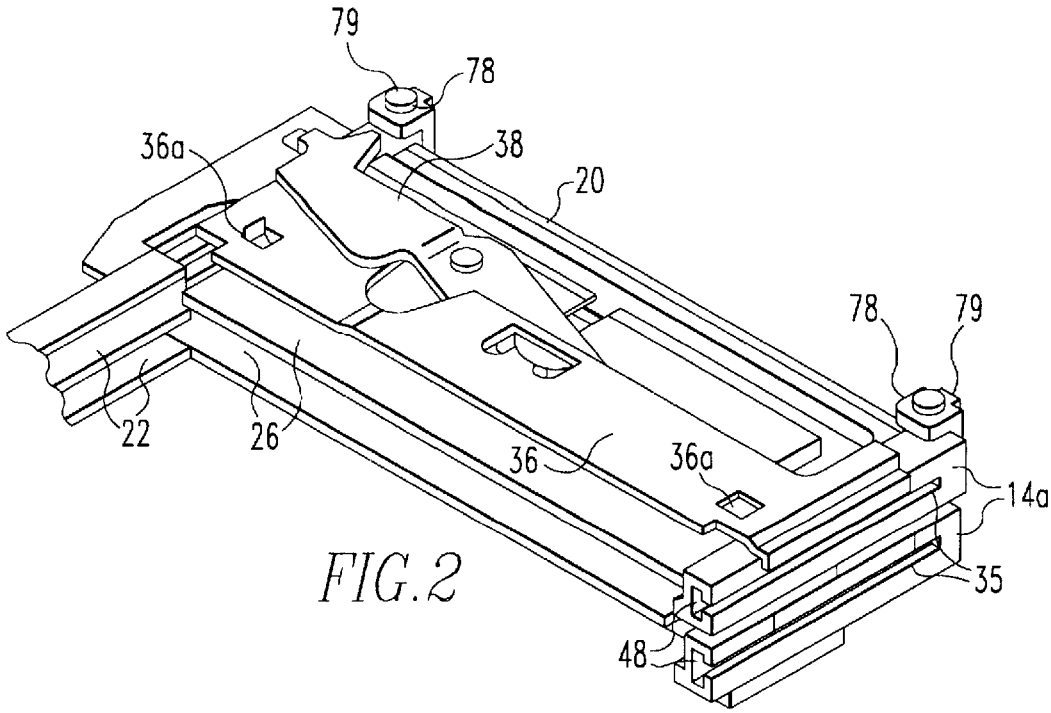
FIG. 2 is a perspective view diagrammatically showing a portion of a forward end section of the card connector of FIG. 1 as viewed from a different direction.
Figure 3:
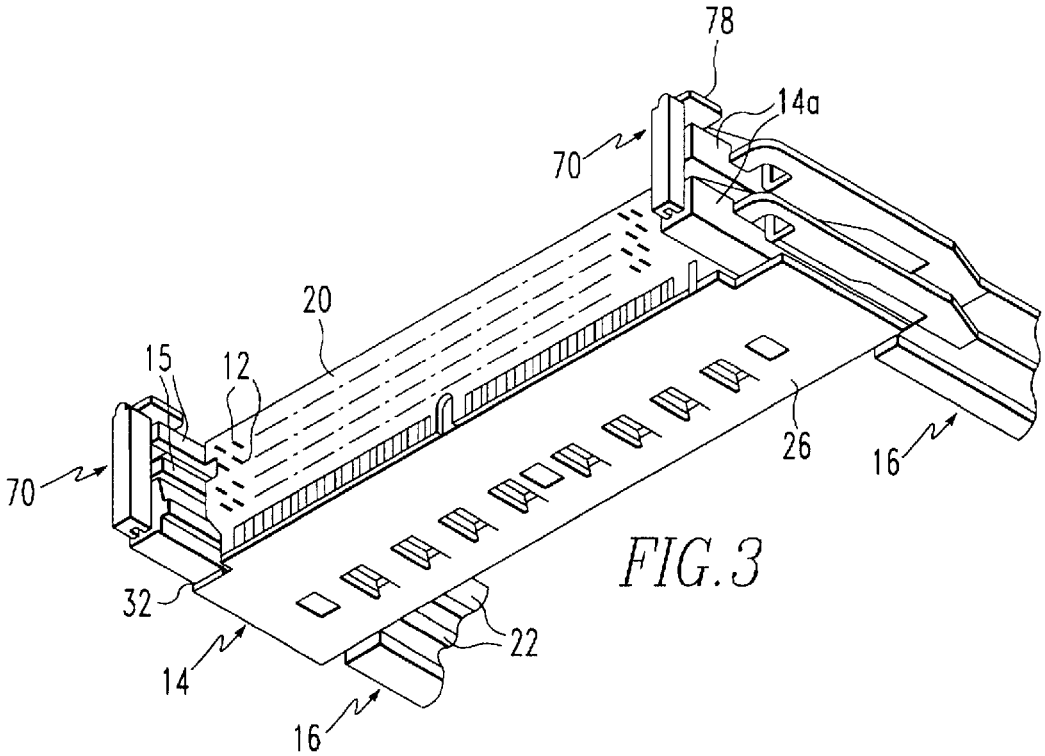
FIG. 3 is a perspective view diagrammatically showing a state of the forward section of the FIG. 1 connector as viewed from a different direction.

As shown in FIG. 1, the card connector 10 has a connector frame comprising a header section 14 having a plurality of terminal pins 12 extending in a width direction and adapted to a connected to a PC card C and a pair of opposed guide arms 16 extending from both side ends of the header section.

In the header section 14, two header bodies 14a of an insulating material have the same structure and are arranged in a stacked fashion in the thickness direction of the PC card C. These header bodies 14a have the forward end sides of the terminal pins 12 inserted into through holes 30 of the small printed circuit board 20 and are soldered at these through holes. Further, the rear end sides of the respective header bodies 14a are integrally coupled by the guide arms 16 at both side end portions and, hence, the respective header bodies 14a provide a strong integral structure with the small printed circuit board 20 and guide arms 16. The respective guide arms 16 have mutually the same structures and are arranged with their guide grooves 22 situated in a mutually opposed relation. Those PC cards C of a various thickness can have their side edge portion guided along the guide grooves 22 and are movable along an insertion/withdrawal direction E. Reference numeral 24 denotes a shield plate and 26 (FIG. 3) a card bus shield to be contacted with the surfaces of the PC card C. These members are soldered such that ground pins projecting at predetermined distances are inserted into the through holes of the small printed circuit board 20.

FIGS. 4 and 5 show the order of an assembling procedure of those members of the card connector 10.

Figure 4A:
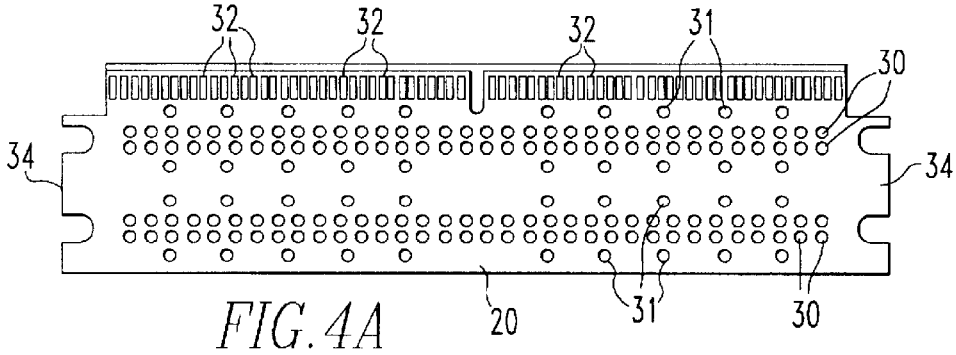
FIGS. 4(A) and 4(B) show a header section of a FIG. 1 card connector, FIG. 4(A) being a diagrammatic view showing a small printed circuit board and FIG. 4(B) an explanative view diagrammatically showing a state in which the small printed circuit board and ejecting device are mounted at a header body.
Figure 4B:
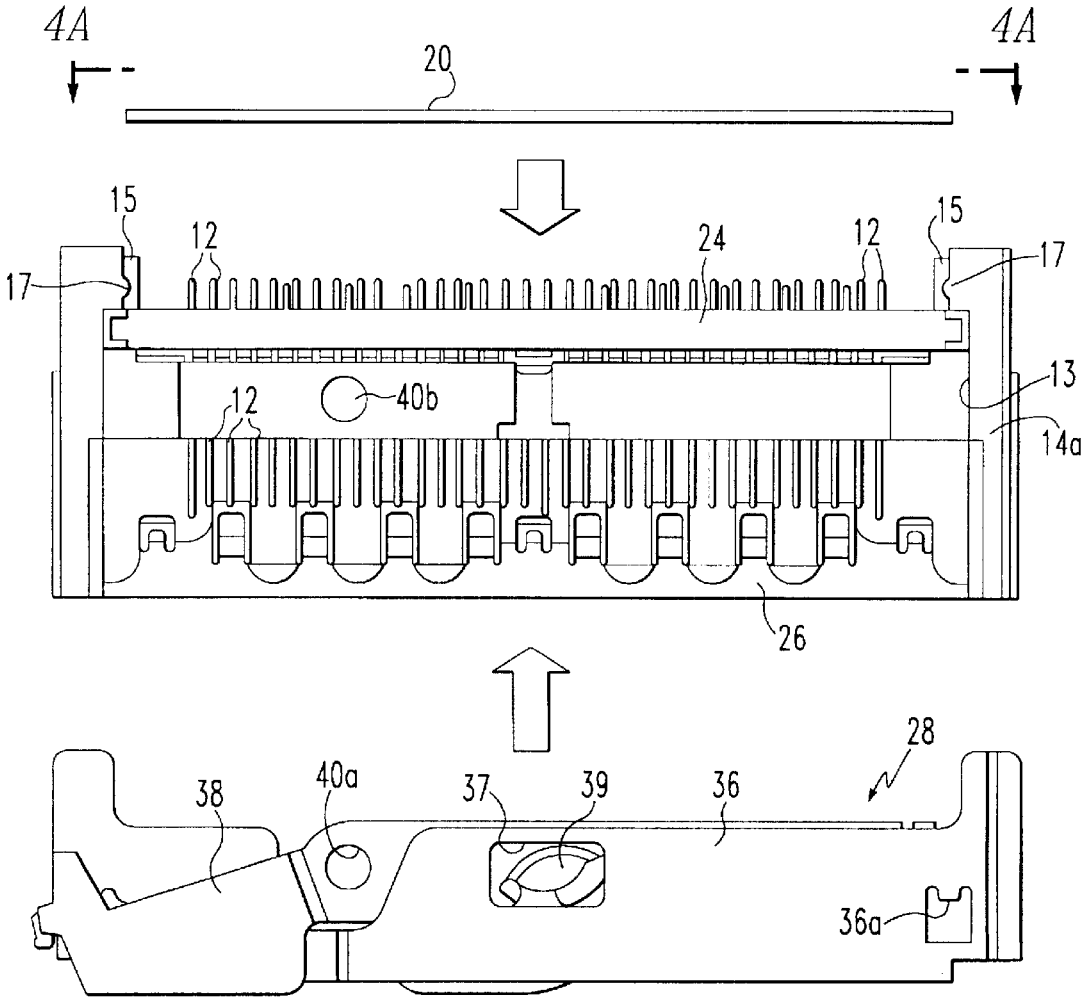

As shown in the middle of FIG. 4(B), the upper or lower stage header body 14a has the shield plate 24 and card bus shield 26 mounted thereat and, further, has the small printed circuit board 20 and ejecting mechanism 28 mounted thereat. As shown in FIG. 4(A), the small printed circuit board 20 has arrays of through holes 30 for receiving two arrays of terminal pins 12 in the respective header body 14a. At the up/down direction of the two arrays of through holes 30 through which the terminal pins 12 are inserted, that is, at a position in which the PC card C is sandwiched from the thickness direction of the PC card, through holes 31 are arranged at predetermined intervals so as to receive ground pins of the shield plate 24 and card bus shield 26. Therefore, four arrays of through holes (30, 31) are arranged so as to correspond to the respective header bodies 14a. The four arrays of through holes (30, 31) corresponding to the respective header bodies 14a are electrically connected to conductive pads 32 formed at a different surface area. By doing so, the conductive pads 32 are so arranged along the edge of both surfaces of the small printed circuit board 20 that they are electrically connected to the terminal pins 12 and ground pins of the respective header bodies 14a.

Further, a projection 24 extends from each side end of the small printed circuit board 20 and serves as a guide adapted to be guided along as projection 15 provided on the header body 14a. Each projection 34 also serves as holding the mutually stacked header bodies 14a at a predetermined distance. With the small printed circuit board 20 completely fitted in the header bodies 14a, the projection 34 is latched by the small projection 17, so that the printed circuit board is held in a predetermined position.

The ejecting mechanism 28 mounted on the header body 14a has an ejecting plate 36 arranged on the respective header body 14 and a link plate 38 for driving the ejecting plate 36. The ejecting plate 36 is formed of a thin metal sheet and guided in the insertion/withdrawal direction E of the PC card C by guide slots 35 (FIGS. 1 and 2) provided at the outer side surfaces of the header bodies. When the ejecting plate 36 is moved in a rear-end side, that is, in the withdrawal direction of the PC card, latching pieces 36a projecting in a recess 14b of the header body 14a is abutted against the forward end edge of the PC card and the ejecting plate 36 is moved together with the PC card. It is preferable that the latching pieces 36a be arranged in a mirror-image relation when viewed from the insertion/withdrawal direction.

The link plate 38 for driving the ejecting plate 36 is formed of the same metal sheet as the ejecting plate 36 and, as shown at the lower side of FIG. 4(B), the link plate 38 engages, like a pair of scissors, with the ejecting plate 36. The link plate 38 has a mount hole 40a in which a mount projection 40b extending from the header body 14a is fitted. Through a combination of the mount hole 40a and mount projection 40b, the link plate 38 is so mounted as to be swingable relative to the header body 14a. A projection 39 extending from a substantially middle of the link plate 38 is projected into an opening 37 provided in a substantially middle of the ejecting plate 6. Through the engagement of the projection 39 with the opening 37 a force is transmitted between the link plate 38 and the ejecting plate 36.

It is preferable that the forward end portion of the link plate 38 extend beyond the projection 39 toward the neighborhood of a latching piece 36a. In this case, a projection piece (not shown) extending into the recess 14b of the header body 14a can be provided on the forward end portion of the link plate 38. After the ejecting plate 36 ejects the PC card C from the terminal pins 12 via the latching piece 36a, the PC card C can be further pushed out in the withdrawal direction, so that the ready handling of the PC card is ensured. Further, a latching piece 56 is projected, from an end side opposite to a side of the link plate 38, so as to engage with a push rod 52 as will be set out below.

In this way, one of the upper and lower stage header bodies 14a with the ejecting mechanism 28 mounted there, together with the other header body, has the smaller printed circuit board 20 fitted therein. By inserting the respective terminal pins 12 and ground pins into the through holes 30 and 31 in the small printed circuit board 20 and soldering them there, the header bodies 14a and small printed circuit board 20 are firmly bonded together. The stacked upper and lower stage header bodies 14a are held, at a predetermined distance, by the projections 34 of the small printed circuit board 20.

The rear end sides of the respective bodies 14a are joined by guide arms 16.

The guide arms 16 mounted on both side ends of the respective header bodies 14a have mutually the same structure and explanation will be given below about one of them.

Figure 5B:
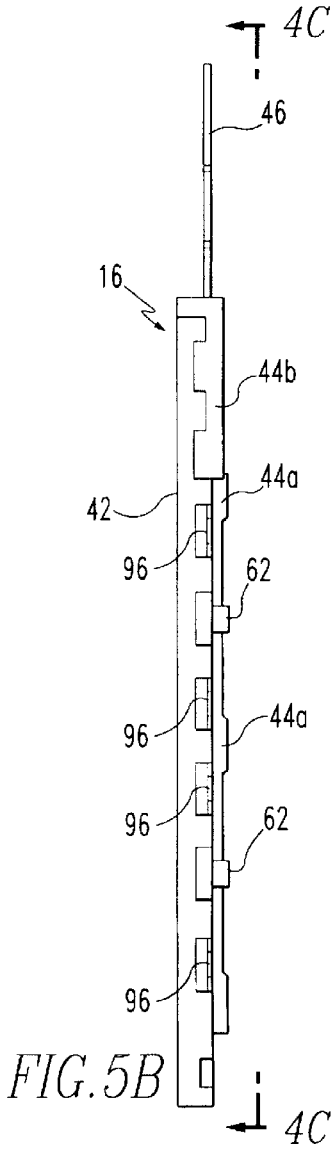
Figure 5C:
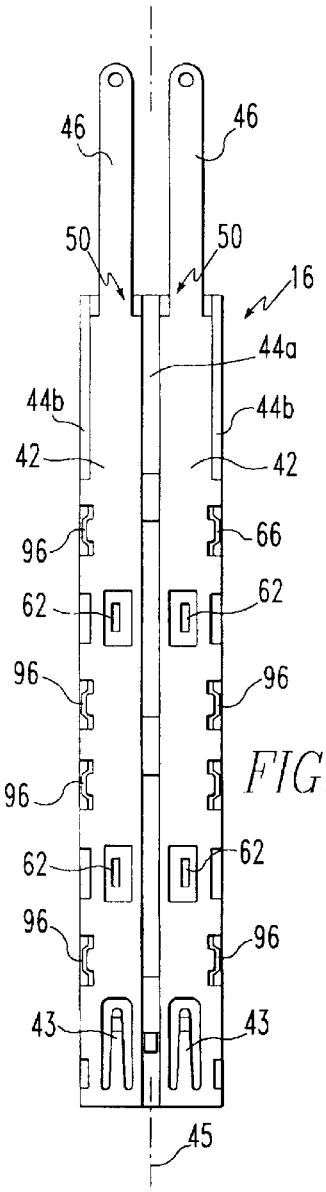

As shown in FIGS. 5(B) and 5(C), the respective guide arms 16, each, provide an integral structure with a core section 42 and resin section 44 injection-molded there, the core section 42 being formed by bending a sheet of metal. The resin section 44 has guide grooves 22 for guiding the side edges of the PC card C. Contacting pieces 43 (see FIG. 5(C)) extend from the core section 42 into the guide grooves 22. The guide arm 16 has joining metal arms 46 projecting from its forward ends in a substantially parallel relation. These joining arms 46 are fitted into the joining holes 48 (FIG. 2) opened at the rear end portions of the header bodies 14a and, by doing so, it is possible to join the rear end sides of the two mutually stacked header bodies 14a. It may be possible to provide a small projection or a recess at these joining arms 46, so that an added frictional force is provided relative to the resin material of the header bodies 14a. As clearly seen from FIG. 5(C), the guide arms 16 have a symmetric configuration with respect to a longitudinal center axis 45 and can be fitted into any side end portions of the headers 14. Further, the guide arms are formed as an integral unit and is easier to manufacture. The contacting pieces 43 extending from the core section 42 into the guide grooves 22 are contacted with the PC card C, before the PC card C reaches the header section 14, and place the PC card C in a ground state through the contacting pieces 43, so that it is possible to prevent a shock resulting from a greater electrostatic voltage difference.

Further, the guide arm 16 is of such a type that a center resin portion 44a and side resin portion 44b extend further toward the outer surface side than the core section 42 and two substantially parallel recesses 50 (FIG. 5(C)) are provided between the center resin portion 44a and the side resin portions 44b. A push rod 52 as shown in FIG. 5(D) is disposed in the recess 50 and can be slidable moved in a longitudinal direction in the recess 50. This push rod 52 has a rod section 54 placed in the recess 50, a hook section 58 latched to the latching section 56 provided at one end of the link plate 38 of the ejecting mechanism 28, and a push button 60 projected from the outer surface of an associated electronic apparatus. The rod section 54 of the push rod 52 has an opening 64 (FIG. 1) for receiving a corresponding stopper 62 projected from the guide arm 16. The moving limit of the push rod 52 is defined by the stopper 62 and opening 64 so as to prevent any undue force from acting on the link plate 38, etc., of the ejecting mechanism 28.

As shown in FIG. 1, the card connector 10 is mounted on the printed circuit board P by paired mount brackets comprising a pair of mount brackets 70 mounted on the header section 14 and two pairs of mount brackets 80 mounted on the guide arms 16.

The brackets 70 mounted on the header section 14, each, include a body section 72 formed of metal plate and a stand-off section 74 extending from the body section 72. Four retaining claws 76 providing tongues are projected from the body section 72. The four retaining claws 76, that is, four tongues, are situated in those positions on two mutually orthogonal symmetric axes. And latch holes 66 with the retaining claws 76 inserted therein have substantially the same configuration and are situated on the forward end side of the header bodies 14a with one pairs of latch holes formed in a parallel array on two mutually orthogonal symmetric axes relative to the other pairs of latch holes. With the mount bracket 70 set in a non-inverted position as shown in FIG. 1 or in an up/down inverted position, the four retaining claws 76 can be latched into the corresponding four latch holes 66.

The stand-off section 74 extends from the body section 72. The forward end section of the stand-off section 74 has a support plate section 78 bent in the same direction as the relating claw 76. A cylindrical projection 79 providing a coupling section extends from the support plate section 78 in a direction away from the body section 72. The center axis of the cylindrical projection 79 is shared by one of the above-mentioned two mutually orthogonal symmetrical axes. The cylindrical projection 79 has a screw hole engaged with a fastening means, that is, a fastening screw 100 (FIG. 7) inserted through the printed board P, so that the screw 100 can be fastened to the cylindrical projection 100. This cylindrical projection 79 can serve as a positioning or temporarily fastening means at a time of positioning the card connector 10 relative to the printed circuit board P.

On the other hand, the two pairs of mount brackets 80 mounted on the guide arms 16 include, each, a body section 82 and stand-off section 84 extending from the body section 82, the body section and stand-off section being formed out of a metal sheet. Tongues 83 are formed by bending the upper and lower edge portions of the body section 82. Latch holes 86 are formed as through holes in the tongues 83. By setting the latch holes 86 in engagement with corresponding retaining claws 96 projected from the upper and lower edge portions of the guide arms 16, the mount brackets 80 are prevented from moving in the longitudinal and lateral directions of the guide arms 16 and, in addition, it is also possible to prevent the mount brackets from moving in a height direction by the upper and lower tongues 83 between which the guide arm 16 is sandwiched. As shown in FIG. 5(C), it is preferable that the retaining claws 96 be formed integral with the core section 42 made of a metal. The tongues 83 and latch holes 86 of the two pairs of mount brackets are situated on two mutually orthogonal symmetric axes relative to the four retaining claws 96 of the guide arm 16.

Like the one pair of mount brackets 70, the stand-off section 84 extends from the body section 82 of the two pairs of mount brackets 80. The forward end portion the stand-off section 74 is bent to provide a support plate section 88. The support plate section 88 is bent on the same sides as the tongues 83. A cylindrical projection 89 with a screw hole provided therein extends in a direction away from the body section 82 to provide a coupling section. The center axis of the cylindrical projection 89 is shared by one of the above-mentioned two symmetrical axes. The mount bracket 80 can also serve as a guide for allowing the push rod 52 to be slidably retained in the recess 50 (FIG. 5(C)) in the guide arm 16. FIGS. 6(A) to 6(D) show the mount bracket 80 on a push rod 52-placing side and the bracket 80a on a push rod not-placing side.

As evident from FIGS. 6(A) and 6(C), the bracket 80a on the push rod not-placing side as opposed to the bracket 80 on the push rod 52-placing side has clearances or openings (92, 94) for receiving the stopper 62 (FIG. 5(C)) and projection of the center resin portion (material) 44a. Further, in the case of the mount bracket 80a, the tongue 83a is less projected than the tongue 83 and can be closely contacted with the outer surface of the guide arm 16.

When the mount bracket (70, 80) is mounted at the printed circuit board P, the corresponding cylindrical projection (79, 89) constituting the coupling section is inserted into the opening, that is, the mount hole, in the printed circuit board P as shown in FIG. 7, and the mount screw 100, that is the fastening means 100, inserted via a washer from an opposite side is threaded into the screw hole of the cylindrical projection (79, 89) to fasten together them. By making the opening, that is, the mount hole, of the printed circuit board P somewhat larger than the outer diameter of the cylindrical projection (79, 89) it is possible to very easily position the card connector 10 relative to the printed circuit board P. Since the screw hole is formed in the cylindrical projection (79, 89) closest to the printed circuit board P, the length of the mount screw 100 can be made shorter through the threading of the mount screw 100 into the screw hole, so that the card connector 10 can be made lighter in weight.

Further, a guide bracket 104 is mounted at an area of the guide arm 16 where the push rod 52 is provided, that is, at an area of the guide arm 16 situated adjacent the header section 14. The guide bracket 104 has a similar structure to the mount bracket 80 except that the former bracket has no cylindrical projection.

In the case where the card connector 10 is mounted on the opposite side of the printed circuit board P, the mount bracket 70, 80 are mounted on the corresponding opposite side with the small printed circuit board 20 on the opposite side, so that the position of the cylindrical projection 79, 89, that is, the position of their screw holes does not vary in the insertion/withdrawal direction E of the PC card C as well as in the width direction of the PC card C. By doing so, it is possible to mount the printed circuit board P on the opposite side while maintaining the same polarity of the PC card C. In this case, since the small printed circuit board 20 is on the opposite side, the conductive pads 32 are connected to the same header bodies 14a on the same side.

Further, the mount brackets 70, 80 allow their support plates 78, 88 to hold the connector frame 18 and printed circuit board P in place, so that a very small area has only to be required to mount the card connector 10 in place.

Figure 8:
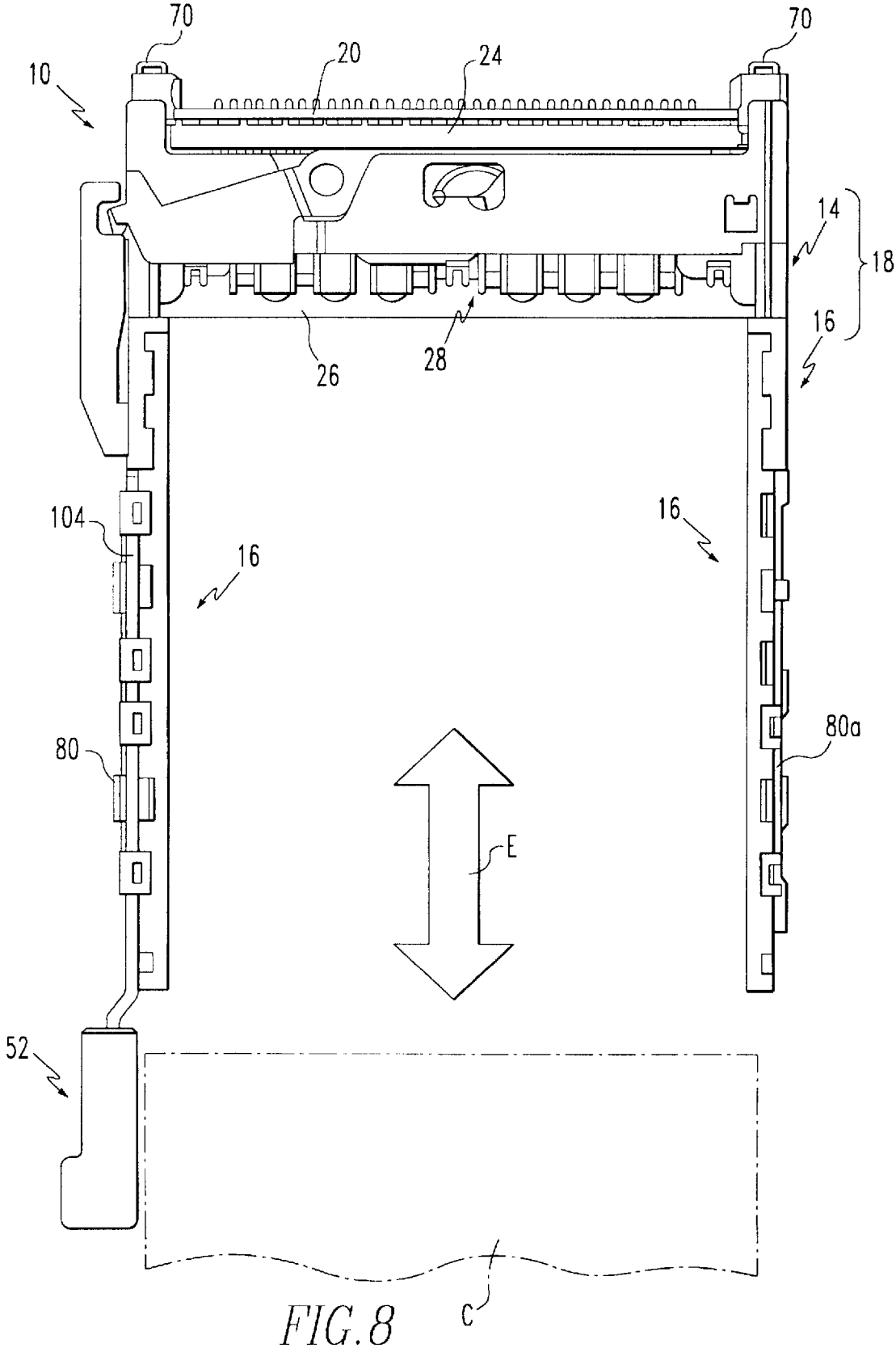
FIG. 8 is a plan view showing a card connector with respective mount brackets mounted on an inverted, as opposed to a non-inverted state.

FIG. 8 shows a state in which the mount brackets 70 and 80 are mounted on the header section 14 and guide arms 16, respectively, in a manner to be occupied from the non-inverted position as shown in FIG. 1 to the inverted position. Even in this case, the polarity of the header bodies 14a, that is, the insertion direction of the PC card C, is held in the same way as shown in FIG. 1. Further, the mount holes, etc., of the printed circuit board P can be used directly without varying their positions.

Although, in the above-mentioned embodiment, the cylindrical projections 79, 89 constituting the coupling sections have the screw hole, it may be possible to form a male screw on the outer periphery of the cylindrical projections instead. In this case, the cylindrical projections 79, 89 may have a solid structure in which case a mount nut is used as the fastening means. As the fastening means, a rivet may be used instead of the mount screw 100 or mount nut. In this case, it is not necessary to form any internally or externally threaded section in or on the cylindrical projection (79, 89).

According to the card connector of the present invention, as evident from the above, the mount brackets are so inverted that their stand-off sections are located on the opposite side. In this inverted position and non-inverted position, the position of each coupling section along the width direction and insertion/withdrawal direction is held in the same corresponding position, whereby it is possible to simply and accurately mount the printed circuit board on either side and hence to provide a card connector having less component parts. Further, it is also possible to reduce the number of component parts of the card connectors by making the respective guide arms the same in structure.

While the present invention has been described in connection with the preferred embodiments of the various figures, it is to be understood that other similar embodiments may be used or modifications and additions may be made to the described embodiments for performing the same function of the present invention without deviating therefrom. Therefore, the present invention should not be limited to any single embodiment, but rather construed in breadth and scope in accordance with the recitation of the appended claims.

I claim:

1. A card connector mounted on a printed circuit board to allow a PC card to be electrically connected to the printed circuit board, comprising:

a connector frame including a header section having a plurality of terminal pins which are connected to the PC card arranged along a width direction of the PC card and a pair of opposed guide arms each extending at each side end of the header section and allowing both side edges of the PC card to be guided along an insertion/withdrawal direction of the PC card;

a plurality of pairs of mount brackets each having a body section mounted on the connector frame, a stand-off section extending from the body section and adapted to retain a predetermined distance between the connector frame and the printed circuit board, and a coupling section projected from the stand-off section into an opening of the printed circuit board and tightened by a fastening means from a side opposite to that of the printed circuit board whereby the connector frame is fixed to the printed circuit board, wherein a latch hole is provided in one of the mount bracket's body section and connector frame and a corresponding retaining claw is provided on the other to allow an insertion into the latch hole and, through an engagement of the retaining claw with the latch hole, the respective body section is fixed to the connector frame, and, when the mount bracket is inverted, the coupling section is situated in the same corresponding position, along a width and insertion/withdrawal directions, with the stand-off section set in that inverted position relative to a non-inverted position so that the [printed circuit board] *card connector* can be mounted in any selected side of the printed circuit board.

2. The card connector according to claim 1, wherein the stand-off section has a support plate section extending from a forward end side and situated between the connector frame and the printed circuit board and the coupling section has a cylindrical projection projected from the support plate section in a direction away from the body section and having a screw hole in an inner wall surface thereof.

3. The card connector according to claim 1, wherein the header section has two header bodies of the same structure mutually stacked along the thickness direction of the PC card and these two header bodies are integrally so jointed that one-end sides in the insertion/withdrawal direction of the PC card are mechanically and electrically connected to those terminal pins inserted from the same side and the other-end sides are held by the paired guide arms.

4. The card connector according to claim 1, further comprising an ejecting mechanism mounted at the header section and adapted to withdraw the PC card and a push rod provided at one of the paired guide arms and adapted to operate the ejecting mechanism, wherein the push rod allows a slidable guide motion of the PC card to be effected, along the insertion/withdrawal direction, between said one guide arm and the corresponding mount bracket.

5. A card connector, comprising a header section having an array of terminal pins connected to a PC card and a pair of opposed guide arms provided on both sides of the header section, extending rearwardly from a rear end section of the header section and adapted to guide each side edge of the PC card in an insertion/withdrawal direction, the card connector being mounted on a printed circuit board to allow electrical connection to be achieved between the PC card and a printed circuit board, wherein the pair of guide arms have mutually the same structure and include a core section formed of a metal plate and a resin portion formed integral with the core section, each resin portion having a guide groove for guiding the side edge portion of the PC card.

6. The card connector according to claim 5, wherein the guide arm has at least one joining arm section projected from the resin portion and is insertable into an associated joining hole opened at a rear end portion of the header section.

7. A mount bracket for mounting, on a printed circuit board, a card connector having a connector frame including a header section having an array of terminal pins connected to a PC card and a pair of opposed guide arms extending from both side ends of the header section and adapted to guide the side edge portions of the PC card in an insertion/withdrawal direction, the mount bracket comprising:

a body section mounted on the connector frame; a stand-off section extending from the body section and allowing a predetermined spacing to be retained between the connector frame and the printed circuit board; and a coupling section projected from the stand-off section into an opening of the printed circuit board and adapted to be tightened by a fastening means from an opposite side of the printed circuit board, wherein the body section has four tongues latched to the connector frame, the four tongues being situated on mutually orthogonal two symmetric axes.

* * * * *